United States Patent
Jeon et al.

(10) Patent No.: US 9,489,069 B2
(45) Date of Patent: Nov. 8, 2016

(54) METHOD FOR CONTROLLING DISPLAY SCROLLING AND ZOOMING AND AN ELECTRONIC DEVICE THEREOF

(71) Applicant: Samsung Electronics Co., Ltd., Suwon-si, Gyeonggi-do (KR)

(72) Inventors: Yong-Joon Jeon, Hwaseong-si (KR); Geon-Soo Kim, Suwon-si (KR); Han-Jib Kim, Suwon-si (KR); Pil-Joo Yoon, Seongnam-si (KR); Soo-Ji Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 14/211,739

(22) Filed: Mar. 14, 2014

(65) Prior Publication Data

US 2014/0267115 A1 Sep. 18, 2014

(30) Foreign Application Priority Data

Mar. 15, 2013 (KR) ........................ 10-2013-0027952

(51) Int. Cl.
*G06F 3/041* (2006.01)
*G06F 3/0485* (2013.01)
*G06F 3/0488* (2013.01)

(52) U.S. Cl.
CPC ............ *G06F 3/041* (2013.01); *G06F 3/0485* (2013.01); *G06F 3/04883* (2013.01); *G06F 2203/04806* (2013.01)

(58) Field of Classification Search
CPC .... G06F 3/041; G06F 3/0412; G06F 3/0416; G06F 3/0485; G06F 3/0488; G06F 3/04883; G06F 2203/04104; G06F 2203/04806; G06F 2203/04808; B60K 2350/1028; B60K 2350/1052
See application file for complete search history.

(56) References Cited

U.S. PATENT DOCUMENTS

| | | | |
|---|---|---|---|
| 8,269,729 B2 * | 9/2012 | Han et al. ................. | 345/173 |
| 2002/0036618 A1 * | 3/2002 | Wakai et al. .............. | 345/157 |
| 2003/0174149 A1 | 9/2003 | Fujisaki et al. | |
| 2006/0001652 A1 | 1/2006 | Chiu et al. | |
| 2006/0007176 A1 | 1/2006 | Shen | |
| 2006/0055662 A1 | 3/2006 | Rimas-Ribikauskas et al. | |
| 2006/0232611 A1 | 10/2006 | Brooke | |
| 2007/0152984 A1 | 7/2007 | Ording et al. | |
| 2008/0129759 A1 * | 6/2008 | Jeon et al. ................. | 345/667 |
| 2008/0165141 A1 * | 7/2008 | Christie ..................... | 345/173 |
| 2008/0168384 A1 | 7/2008 | Platzer et al. | |
| 2009/0183930 A1 | 7/2009 | Yang et al. | |
| 2010/0079501 A1 * | 4/2010 | Ikeda et al. ............... | 345/661 |
| 2010/0141589 A1 * | 6/2010 | Hoover ..................... | 345/173 |
| 2011/0102455 A1 | 5/2011 | Temple | |
| 2011/0163981 A1 | 7/2011 | Ito et al. | |
| 2011/0216094 A1 | 9/2011 | Murakami | |
| 2011/0298830 A1 | 12/2011 | Lam | |

(Continued)

FOREIGN PATENT DOCUMENTS

| EP | 2 042 976 A1 | 4/2009 |
|---|---|---|
| EP | 2 309 370 A2 | 4/2011 |

(Continued)

*Primary Examiner* — Keith Crawley
(74) *Attorney, Agent, or Firm* — Jefferson IP Law, LLP

(57) ABSTRACT

A method and apparatus for zooming in/out and displaying display information in an electronic device are provided. The method includes detecting an angle according to a touch movement and zooming in/out display information based on the angle according to the touch movement.

31 Claims, 17 Drawing Sheets

(56) References Cited

U.S. PATENT DOCUMENTS

| | | | |
|---|---|---|---|
| 2012/0127107 A1* | 5/2012 | Miyashita | G06F 3/04883 345/173 |
| 2012/0229410 A1* | 9/2012 | Ohashi | 345/173 |
| 2013/0014042 A1* | 1/2013 | Ren et al. | 715/765 |
| 2013/0106745 A1* | 5/2013 | Yang et al. | 345/173 |
| 2013/0169552 A1* | 7/2013 | Hsieh | 345/173 |
| 2013/0194226 A1* | 8/2013 | Benhamouda | 345/174 |
| 2013/0222340 A1* | 8/2013 | Ito | 345/174 |

FOREIGN PATENT DOCUMENTS

| | | |
|---|---|---|
| KR | 10-2010-0128453 A | 12/2010 |
| KR | 10-2011-0093080 A | 8/2011 |
| WO | 2010/025045 A2 | 3/2010 |

* cited by examiner

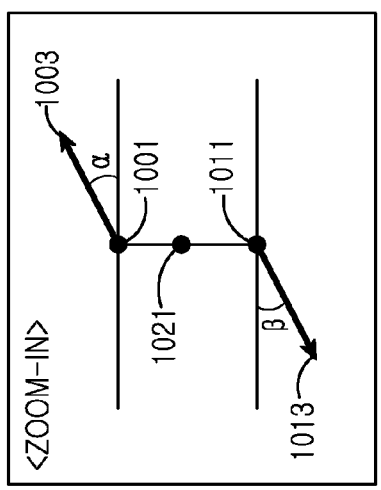
FIG.10A <ZOOM-IN>
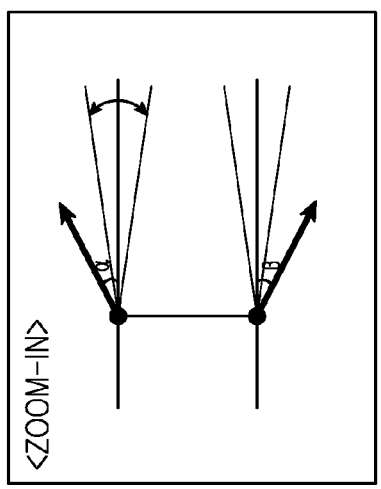
FIG.10B <ZOOM-IN>
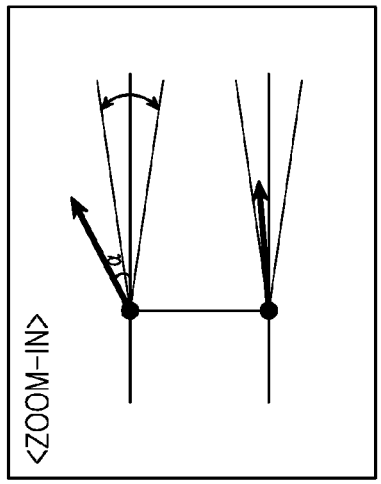
FIG.10C <ZOOM-IN>
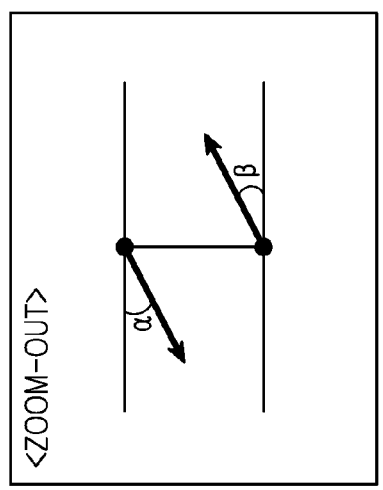
FIG.10D <ZOOM-OUT>
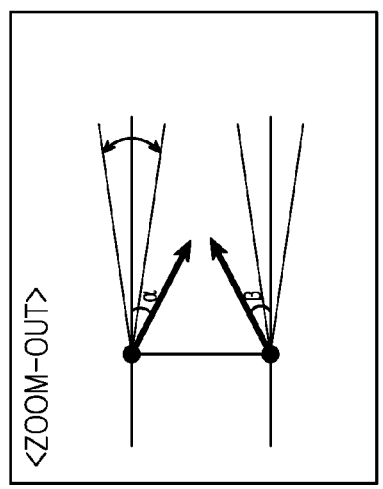
FIG.10E <ZOOM-OUT>
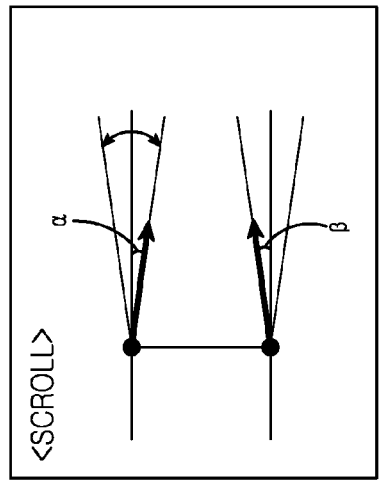
FIG.10F <SCROLL>

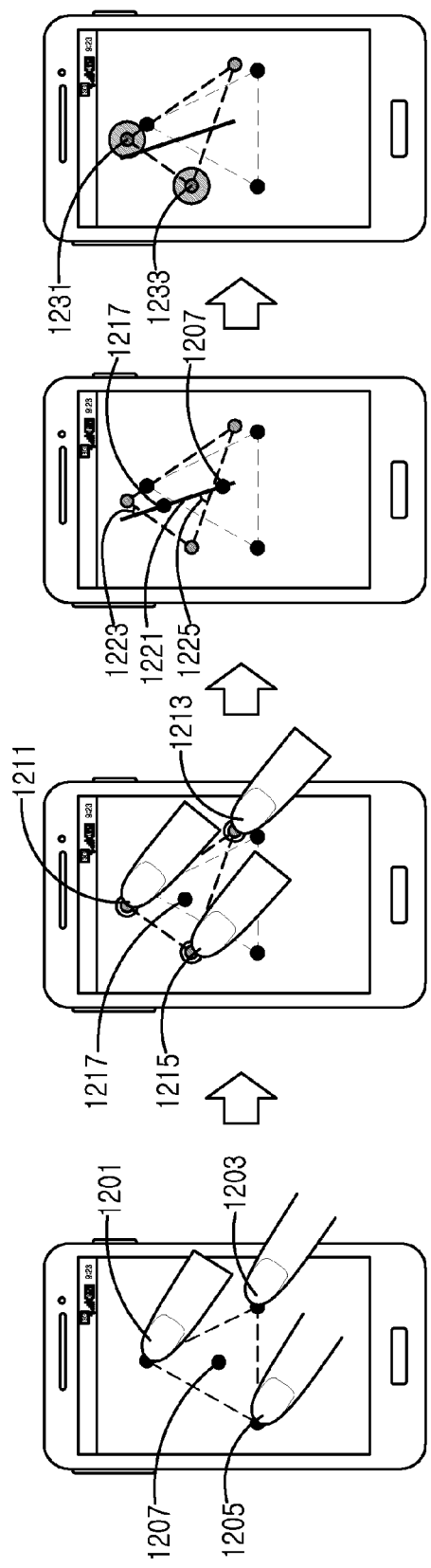

METHOD FOR CONTROLLING DISPLAY SCROLLING AND ZOOMING AND AN ELECTRONIC DEVICE THEREOF

CROSS-REFERENCE TO RELATED APPLICATION(S)

This application claims the benefit under 35 U.S.C. §119 (a) of a Korean patent application filed on Mar. 15, 2013 in the Korean Intellectual Property Office and assigned Serial number 10-2013-0027952, the entire disclosure of which is hereby incorporated by reference.

TECHNICAL FIELD

The present disclosure relates to a method for controlling a display function and an electronic device thereof.

BACKGROUND

As the use of a multimedia service using a portable electronic device has increased, an amount of information which must be processed and displayed in the portable electronic device has also increased. Accordingly, there is a growing interest in a portable electronic device having a touch screen which may improve space utilization and increase a size of a display unit thereof.

The touch screen is an input and output device for inputting and displaying information. Accordingly, when the touch screen is installed in the electronic device, the electronic device may increase a display size by removing a separate input device such as a keypad.

As services which must be processed in the portable electronic device to satisfy various needs of a user is increased, it is a major issue to design a user interface for allowing the user to easily access the various services. In addition, because the portable electronic device includes a display size of a limited size due to portability, it is more necessary to provide a user interface for allowing the user to easily access the various services. For example, although the portable electronic device provides various contents to satisfy various needs of the user, there may be a problem in that the portable electronic device displays small contents due to a limited display size or displays only some of the contents. Accordingly, there is a need to provide a user interface of the portable electronic device for controlling functions such as zooming-in/out of contents, documents, or images displayed on a display unit of the portable electronic device.

As described above, when the touch screen is installed in the portable electronic device, because the portable electronic device does not have a separate input device such as a keypad, the portable electronic device operates different from an electronic device having its input device installed separately. Therefore, there is a need to provide an improved user interface for providing convenience of the user according to the touch screen in the portable electronic device having the touch screen. For example, there is a need to provide an improved user interface for zooming in/out a screen using the touch screen in the portable electronic device having the touch screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for zooming in/out display information in an electronic device.

Another aspect of the present disclosure is to provide a method and apparatus for zooming in/out display information based on a directivity of a touch movement in an electronic device.

Another aspect of the present disclosure is to provide a method and apparatus for zooming in/out display information based on an angle change of a touch movement in an electronic device.

Another aspect of the present disclosure is to provide a method and apparatus for determining touch points for determining an angle change of a touch movement based on the center of gravity of multi-touch points in an electronic device.

In accordance with an aspect of the present disclosure, a method of providing a zoom function in an electronic device is provided. The method includes detecting an angle according to a touch movement on the electronic device and zooming in/out display information based on the angle according to the touch movement.

In accordance with another aspect of the present disclosure, an electronic device is provided. The electronic device includes a touch screen and at least one processor, wherein the at least the one processor verifies an angle according to a touch movement on the electronic device and zooms in/out display information displayed on the touch screen based on the angle according to the touch movement.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 10A, 10B, 10C, 10D, 10E, and 10F illustrate a process of determining a touch function in an electronic device according to an embodiment of the present disclosure;

FIGS. 12A, 12B, 12C, and 12D are screens illustrating a process of determining a reference touch point in an electronic device according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a description will be given for a method and apparatus for zooming in/out display information in an electronic device. The display information may include contents displayed on a display unit of the electronic device.

The electronic device may include at least one of various electronic devices, each of them having its touch screen. For example, the electronic device may be any one of a mobile communication terminal, a Personal Digital Assistant (PDA), a laptop computer, a desktop computer, a smart phone, a netbook, a television, a Mobile Internet Device (MID), a Ultra Mobile Personal Computer (UMPC), a tablet PC, a navigation device, a Moving Picture Experts Group (MPEG) layer 3 (MP3) player, a washing machine, a drying machine, an acoustic apparatus, a set-top box, a home control device, etc.

Hereinafter, a touch may refer to a state where touch input is detected and is also referred to as a touch-down. A touch movement may refer to a state where a touch point is moved in a state where a touch is held. A touch release may refer to a state where a touch input is ended and may also refer to as a touch-up. Herein, when a touch movement distance is greater than a touch movement recognition distance, the electronic device may recognize that a touch movement is generated. That is, when the touch movement distance is less than or equal to the touch movement recognition distance, the electronic device may recognize that a touch is held.

Figure 1:
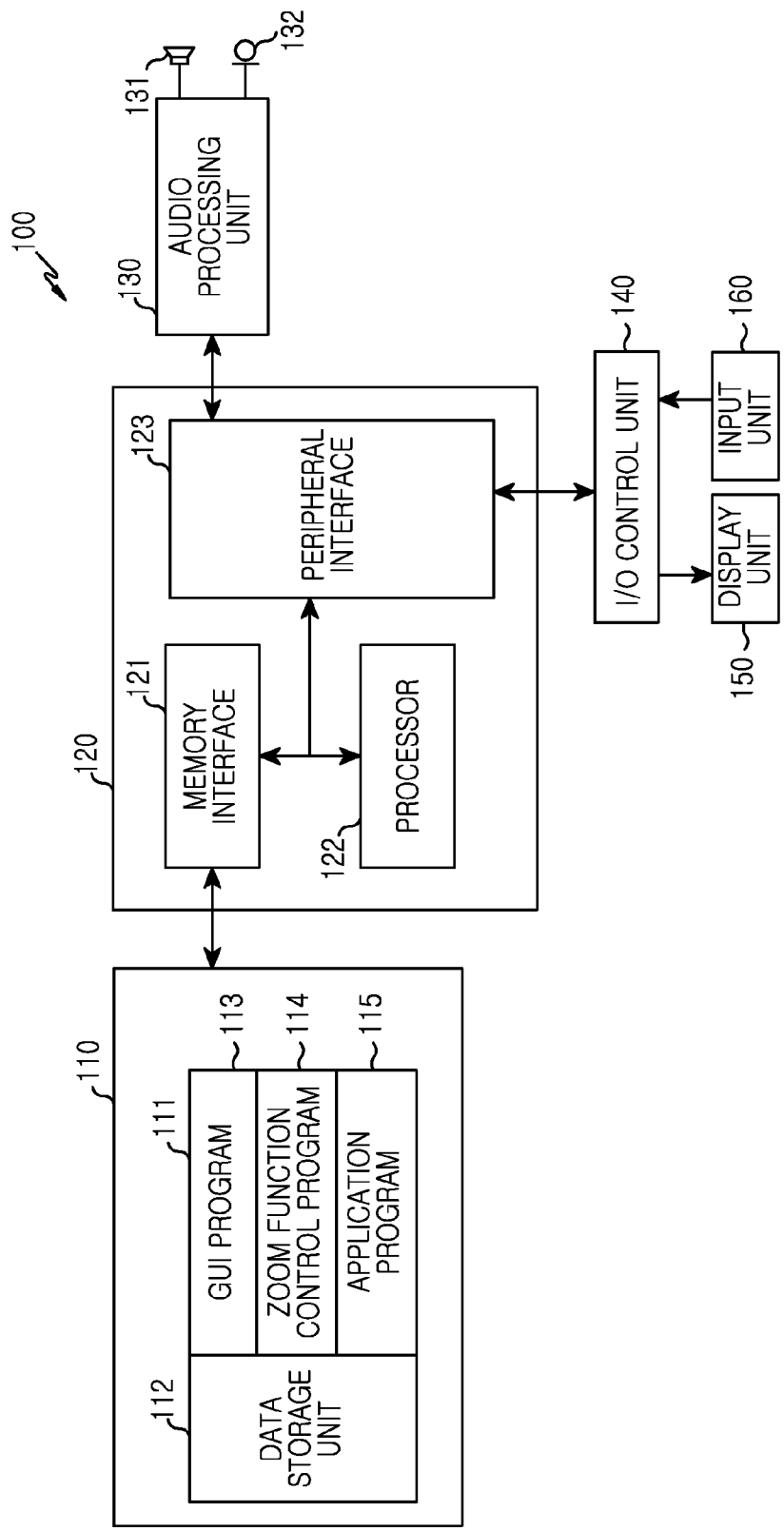
FIG. 1 is a block diagram illustrating a configuration of an electronic device according to one embodiment of the present disclosure.

FIG. 1 is a block diagram illustrating a configuration of an electronic device according to an embodiment of the present disclosure.

Referring to FIG. 1, the electronic device denoted by 100 may include a memory 110, a processor unit 120, an audio processing unit 130, an Input/Output (I/O) control unit or controller 140, a display unit 150, and an input device 160. Herein, the memory 110 may be a plurality of memories.

The memory 110 may include a program storing unit 111 for storing programs for controlling operations of the electronic device 100 and a data storing unit 112 for storing data generated while the programs are executed.

The program storing unit 111 includes a Graphic User Interface (GUI) program 113, a zoom function control program 114, and at least one application program 115. Herein, the programs included in the program storing unit 111 may be expressed in an instruction set as a set of instructions.

The GUI program 113 includes at least one software component for providing a UI as graphics on the display unit 150. For example, the GUI program 113 controls the display unit 150 to display information of an application program executed by the processor 122. If a zoom-in/out for display information is determined through the zoom function control program 114, the GUI program 113 may control the display unit 150 to zoom in/out and display information on the display unit 150. Herein, the GUI program 113 may control the display unit 150 to zoom in/out and display information according to a magnification determined by the zoom function control program 114.

The zoom function control program 114 includes at least one software component for determining a touch function according to a touch movement based on a touch movement direction. In more detail, the zoom function control program 114 may determine whether to perform a zoom or scroll function for displaying information based on a change angle according to a touch movement.

FIGS. 5A, 5B, 5C, and 5D are screens illustrating a process of providing a zoom function based on touch information in an electronic device according to an embodiment of the present disclosure.

Figure 5A:
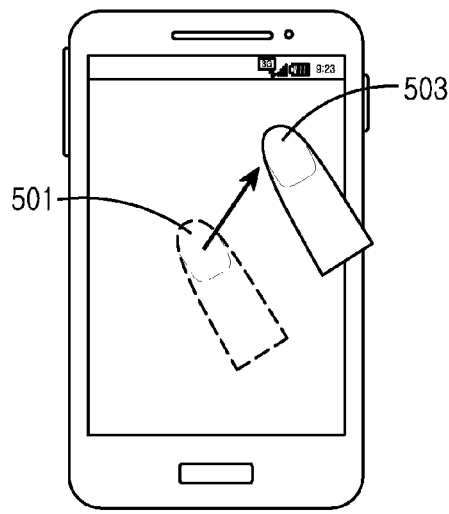
FIGS. 5A, 5B, 5C, and 5D are screens illustrating a process of providing a zoom function based on touch information in an electronic device according to an embodiment of the present disclosure.
Figure 5B:
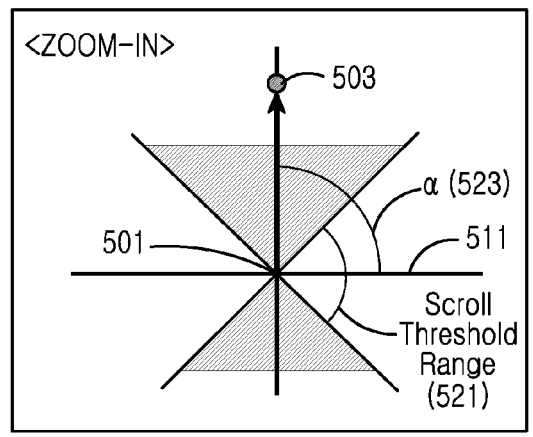
Figure 5C:
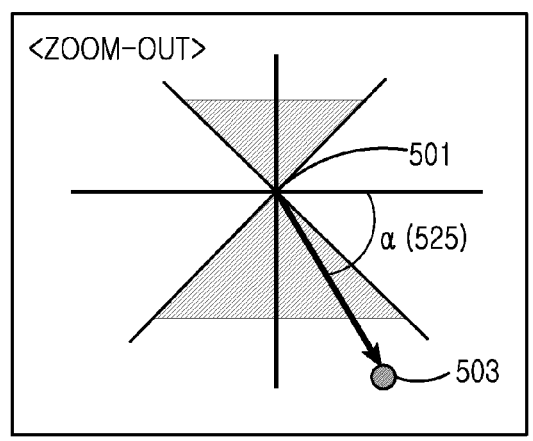
Figure 5D:
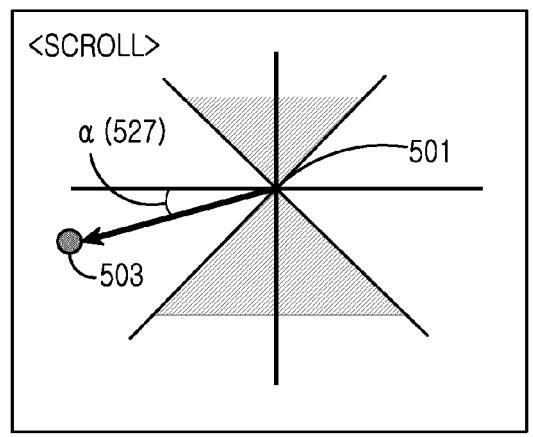

For example, as shown in FIG. 5A, when a touch movement (from a first touch point 501 to a second touch point 503) is detected, the zoom function control program 114 may determine a change angle α according to the touch movement based on a horizontal line 511 which passes through the first touch point 501 shown in FIG. 5B. As shown in FIGS. 5B and 5C, if each of change angles α (523, and 525) according to touch movements gets out of a scroll threshold range 521, the zoom function control program 114 may determine that a zoom function for display information is provided. Herein, the zoom function control program 114 may determine a zoom-in/out for displaying information based on a touch movement direction. Also, the zoom function control program 114 may also determine a zoom-in/out magnification based on a touch movement distance. On the other hand, as shown in FIG. 5D, when a change angle α (527) according to a touch movement is included in the scroll threshold range 521, the zoom function control program 114 may determine that a scroll function for display information is provided. Herein, the horizontal line 511 may include a line which is horizontal with the display unit 150.

FIGS. 7A, 7B, 7C, and 7D are screens illustrating a process of providing a zoom function based on touch information in an electronic device according to another embodiment of the present disclosure.

Figure 7A:
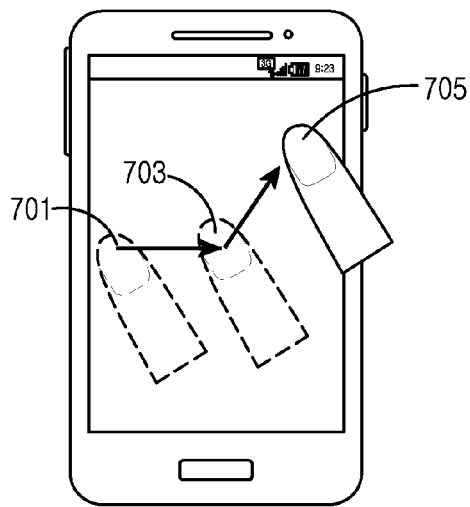
FIGS. 7A, 7B, 7C, and 7D are screens illustrating a process of providing a zoom function based on touch information in an electronic device according to another embodiment of the present disclosure.

For another example, as shown in FIG. 7A, when a touch movement direction change point 703 is detected in a touch movement (from a first touch point 701 to a second touch point 705 through the touch movement direction change point 703), the zoom function control program 114 recognizes that a zoom function providing event is generated. Accordingly, the zoom function control program 114 determines whether to provide a zoom function based on a touch movement distance λ 723, 727 and 731 from the first touch point 701 to the touch movement direction change point 703. In more detail, when the touch movement distance is greater than or equal to a reference distance, the zoom function control program 114 may determine that a scroll function according to a touch movement is provided.

Figure 7B:
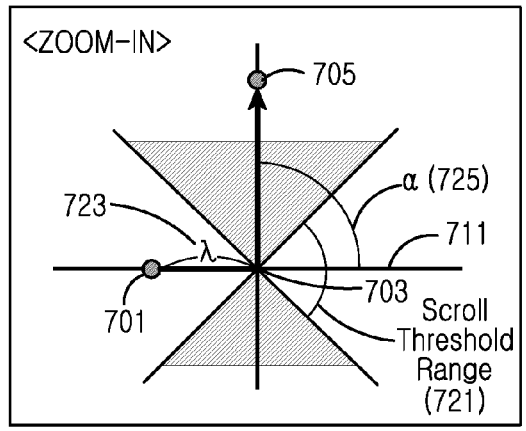
Figure 7C:
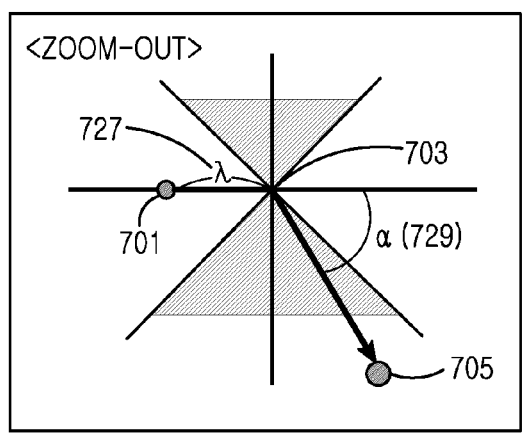
Figure 7D:
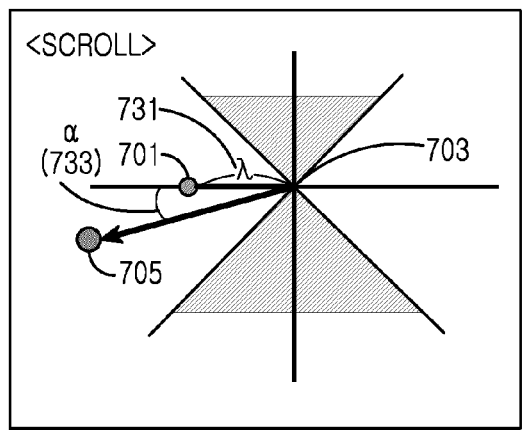

On the other hand, when the touch movement distance is less than the reference distance, the zoom function control program 114 may determine a change angle α according to a touch movement based on a horizontal line 711 which passes through the touch movement direction change point 703 shown in FIG. 7B. As shown in FIGS. 7B and 7C, if each of the change angles α (725 and 729) according to the touch movements gets out of a scroll threshold range 721, the zoom function control program 114 may determine that a zoom function for display information is provided. Herein, the zoom function control program 114 may determine a zoom-in/out for display information based on a touch movement direction. Also, the zoom function control program 114 may determine a zoom-in/out magnification based on the touch movement distance. On the other hand, as shown in FIG. 7D, when a change angle α (733) according to a touch movement is included in the scroll reference range 721, the zoom function control program 114 may determine that a scroll function for display information is provided. Herein, the horizontal line 711 may include a line which is horizontal with the display unit 150.

Figure 9:
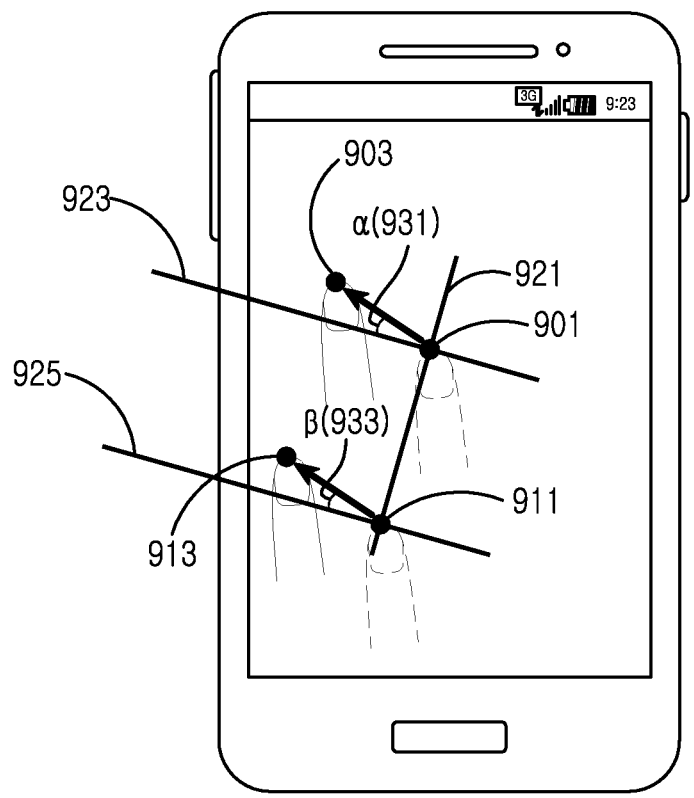
FIG. 9 is a screen illustrating a process of determining a touch function based on two touch points in an electronic device according to an embodiment of the present disclosure.

FIG. 9 is a screen illustrating a process of determining a touch function based on two touch points in an electronic device according to an embodiment of the present disclosure.

For another example, as shown in FIG. 9, when a movement for a multi-touch is detected, the zoom function control program 114 sets two reference segments 923 and 925 which are orthogonal to a first segment 921 for connecting touch points 901 and 911 with touch points 903 and 913 and passes through the touch points 901 and 911, respectively. Thereafter, the zoom function control program 114 may determine change angles α (931) and β (933) according to touch movements based on each of the reference segments 923 and 925. If the sum of the change angles α and β according to the touch movements is greater than a first scroll threshold angle, the zoom function control program 114 may determine that display information is zoomed in. Herein, the zoom function control program 114 may determine a zoom-in magnification based on a distance of the touch points. When the sum of the change angles α and β according to the touch movements is less than a second scroll threshold angle, the zoom function control program 114 may determine that display information is zoomed out. Herein, the zoom function control program 114 may determine a zoom-out magnification based on a distance of the touch points. When the sum of the change angles α and β according to the touch movements is less than or equal to the first scroll threshold angle and is greater than or equal to the second scroll threshold angle, the zoom function control program 114 may determine that a scroll function for display information is provided.

In addition, when touch movements for three or more touch points are detected, the zoom function control program 114 may select two of the touch points as reference touch points based on the center of gravity by the touch points. Thereafter, the zoom function control program 114 may determine the change angles α and β according to the touch movements based on reference segments for the reference touch points.

The application program 115 includes a software component for at least one application program installed in the electronic device 100.

The processor unit 120 may include a memory interface 121, at least one processor 122, and a peripheral interface 123. Herein, the memory interface 121, the at least the one processor 122, and the peripheral interface 123 which are included in the processor unit 120 may be integrated in at least one Integrated Circuit (IC) or be separately implemented.

The memory interface 121 controls accesses to the memory 110 of a component like the processor 122 or the peripheral interface 123.

The peripheral interface 123 controls connections between an I/O peripheral of the electronic device 100, the processor 122, and the memory interface 121.

The processor 122 provides a variety of multimedia services using at least one software program. Herein, the processor 122 executes at least one program stored in the memory 110 and provides a service according to the corresponding program. For example, the processor 122 may execute the zoom function control program 114 stored in the program storing unit 111 and determine a touch function according to a touch movement.

The audio processing unit 130 provides an audio interface between the user and the electronic device 100 through a speaker 131 and a microphone 132.

The I/O controller 140 provides an interface between I/O devices, such as the display device 150 and the input device 160, and the peripheral interface 123.

The display unit 150 displays state information of the electronic device 100, characters input by the user, moving pictures, still pictures, etc. For example, the display unit 150 displays information of an application program executed by the processor 122.

The input device 160 provides input data generated by selection of the user to the processor unit 120 through the I/O controller 140. Herein, the input device 160 may include a keypad including at least one hardware button, a touch pad for sensing touch information, etc. For example, the input device 160 may provide the touch information, such as a touch, a touch movement, and a touch release, which is detected through the touch pad to the processor 122 through the I/O controller 140.

In addition, the electronic device 100 may include a communication system (not shown) for performing a communication function for voice and data communication. Herein, the communication system may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, a Near Field Communication (NFC) network etc.

In the above-described embodiment of the present disclosure, the processor 122 may execute the software components stored in the program storing unit 111 in one module and determine the touch function according to the touch movement.

Figure 2:
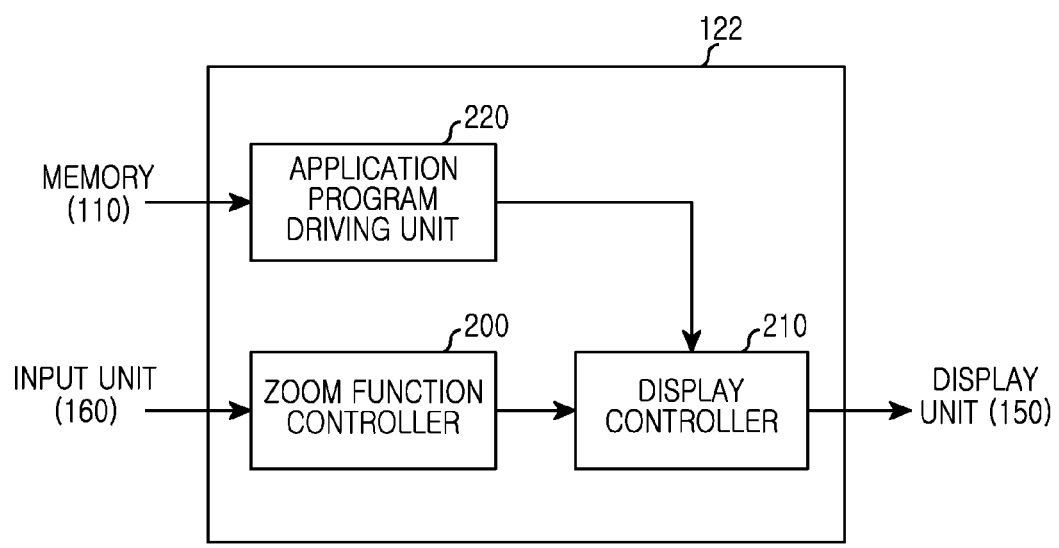
FIG. 2 is a block diagram illustrating a configuration of a processor according to one embodiment of the present disclosure.

In another embodiment of the present disclosure, the processor 122 may include, as shown in FIG. 2, separate modules for determining the touch function according to the touch movement.

FIG. 2 is a block diagram illustrating a detailed configuration of a processor according to an embodiment of the present disclosure.

Referring to FIGS. 1 and 2, the processor 122 includes a zoom function controller 200, a display controller 210, and an application program driving unit 220.

The zoom function controller 200 may execute the zoom function control program 114 stored in the program storing unit 111 and determine a touch function according to a touch movement based on a touch movement direction. In more detail, the zoom function controller 200 may determine whether to perform a zoom or scroll function for display information based on a change angle according to a touch movement. For example, as shown in FIG. 5A, when a touch movement (from a first touch point 501 to a second touch point 503) is detected, the zoom function controller 200 may determine a change angle $\alpha$ according to the touch movement based on a horizontal line 511 which passes through the first touch point 501 shown in FIG. 5B. As shown in FIGS. 5B and 5C, if each of the change angles $\alpha$ according to touch movements gets out of a scroll threshold range 521, the zoom function controller 200 may determine that a zoom function for display information is provided. Herein, the zoom function controller 200 may determine a zoom-in/out for display information based on a touch movement direction. Also, the zoom function controller 200 may determine a zoom-in/out magnification based on a touch movement distance. On the other hand, as shown in FIG. 5D, when a change angle $\alpha$ 527 according to a touch movement is included in the scroll threshold range 521, the zoom function controller 200 may determine that a scroll function for display information is provided. Herein, the horizontal line 511 may include a line which is horizontal with the display unit 150.

For another example, as shown in FIG. 7A, when a touch movement direction change point 703 is detected in touch movement (from a first touch point 701 to a second touch point 705 through the touch movement direction change point 703), the zoom function controller 200 recognizes that a zoom function providing event is generated. Accordingly, the zoom function controller 200 determines whether to provide a zoom function based on a touch movement distance $\lambda$ 723, 727 and 731 from the first touch point 701 to the touch movement direction change point 703. In more detail, when the touch movement distance is greater than or equal to a reference distance, the zoom function controller 200 may determine that a scroll function according to a touch movement is provided.

On the other hand, when the touch movement distance is less than the reference distance, the zoom function controller 200 may determine a change angle $\alpha$ according to a touch movement based on a horizontal line 711 which passes through the touch movement direction change point 703 shown in FIG. 7B. As shown in FIGS. 7B and 7C, if each of the change angles $\alpha$ (725, 729) according to the touch movements gets out of a scroll threshold range 721, the zoom function controller 200 may determine that a zoom function for display information is provided. Herein, the zoom function controller 200 may determine a zoom-in/out for display information based on a touch movement direction. Also, the zoom function controller 200 may determine a zoom-in/out magnification based on the touch movement distance. On the other hand, as shown in FIG. 7D, when a change angle $\alpha$ (733) according to a touch movement is included in the scroll threshold range 721, the zoom function controller 200 may determine that a scroll function for display information is provided. Herein, the horizontal line 711 may include a line which is horizontal with the display unit 150.

For another example, as shown in FIG. 9, when a movement for a multi-touch is detected, the zoom function controller 200 sets two reference segments 923 and 925 which are orthogonal to a first segment 921 for connecting touch points 901 and 911 with touch points 903 and 913 and pass through the touch points 901 and 911, respectively. Thereafter, the zoom function controller 200 may determine change angles $\alpha$ (931) and $\beta$ (933) according to touch movements based on each of the reference segments 923 and 925. If the sum of the change angles $\alpha$ and $\beta$ according to the touch movements is greater than a first scroll threshold angle, the zoom function controller 200 may determine that display information is zoomed in. Herein, the zoom function controller 200 may determine a zoom-in magnification based on a distance of the touch points. When the sum of the change angles $\alpha$ and $\beta$ according to the touch movements is less than a second scroll threshold angle, the zoom function controller 200 may determine that display information is zoomed out. Herein, the zoom function controller 200 may determine a zoom-out magnification based on a distance of the touch points. When the sum of the change angles $\alpha$ and β according to the touch movements is less than or equal to the first scroll threshold angle and is greater than or equal to the second scroll threshold angle, the zoom function controller 200 may determine that a scroll function for display information is provided.

In addition, when touch movements for three or more touch points are detected, the zoom function controller 200 may select two of the touch points as reference touch points based on the center of gravity by the touch points. Thereafter, the zoom function controller 200 may determine the change angles α and β according to the touch movements based on reference segments for the reference touch points.

The display controller 210 may execute the GUI program 113 stored in the program storing unit 111 and control the display unit 150 to display a UI as graphics. For example, the display controller 210 controls the display unit 150 to display information of an application program executed by the application program driving unit 220. If the zoom function controller 200 determines a zoom-in/out for display information, the display controller 210 may control the display unit 150 to zoom in/out and display information on the display unit 150. Herein, the display controller 210 may control the display unit 150 to zoom in/out and display information according to a magnification determined by the zoom function controller 200.

The application program driving unit 220 executes at least the one application program 115 stored in the program storing unit 111 and provides a service according to the corresponding application program.

In the above-described embodiment of the present disclosure, the electronic device 100 includes the zoom function controller 200 of the processor 122 for executing the zoom function control program 114 and determining the touch function according to the touch movement.

In another embodiment of the present disclosure, the electronic device 100 may include a separate control module for determining the touch function according to the touch movement.

Figure 3A:
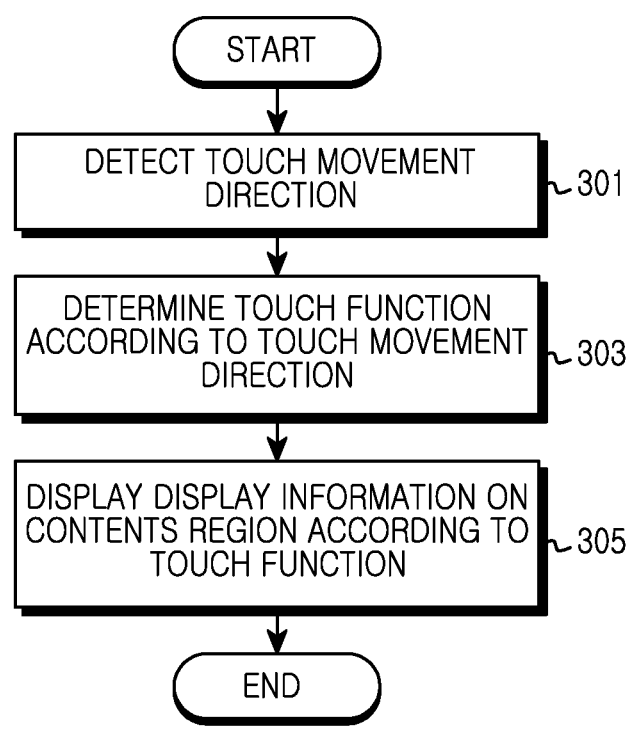
FIG. 3A is a flowchart illustrating a process of providing a zoom function based on a directivity of a touch movement in an electronic device according to one embodiment of the present disclosure.

FIG. 3A is a flowchart illustrating a process of providing a zoom function based on a directivity of a touch movement in an electronic device according to one embodiment of the present disclosure.

Referring to FIG. 3A, the electronic device verifies a touch movement direction when a touch movement is detected in operation 301. For one example, the electronic device may determine a change angle α according to a touch movement based on a horizontal line 511 which passes through a first touch point 501 shown in FIG. 5B. For another example, the electronic device may determine a change angle α according to a touch movement based on a horizontal line 711 which passes through a touch movement direction change direction 703 shown in FIG. 7B. For another example, the electronic device may determine change angles α in operation 931 and β in operation 933 according to touch movements based on two reference segments 923 and 925 which are orthogonal to a first segment 921 for connecting touch points 901 and 911 with touch points 903 and 913 shown in FIG. 9 and pass through the touch points 901 and 911, respectively. If touch movements for three or more touch points are detected, the electronic device may select two of the touch points as reference touch points based on the center of gravity by the touch points. Herein, each of the horizontal lines 511 and 711 may include a line which is horizontal with a display unit.

After detecting the touch movement direction, the electronic device proceeds to operation 303 and determines a touch function according to the touch movement direction. For example, when the change angle α according to the touch movement is beyond a scroll threshold range, the electronic device may determine that a zoom function for display information is provided. Herein, the electronic device may determine a zoom-in/out for display information according to a touch movement direction. On the other hand, when the change angle α according to the touch movement is within the scroll threshold range, the electronic device may determine that a scroll function for display information is provided. According to another example, the electronic device may compare the sum of change angles according to touch movements with a scroll threshold angle and determine whether a zoom function is provided. In more detail, when the sum of the change angels according to the touch movements is greater than a first scroll threshold angle, the electronic device may determine that display information is zoomed in. When the sum of the change angles according to the touch movements is less than a second scroll threshold angle, the electronic device may determine that display information is zoomed out. When the sum of the change angles according to the touch movements is less than or equal to the first scroll threshold angle and is greater than or equal to the second scroll threshold angle, the electronic device may determine that a scroll function for display information is provided.

After determining the touch function according to the touch movement direction, the electronic device proceeds to operation 305 and displays information on a contents region according to the touch function according to the touch movement direction. For example, the electronic device may zoom in and display information on a contents region. Herein, the electronic device may zoom in and display information according to a zoom-in magnification determined based on a touch movement distance or a distance of touch points. Alternatively, the electronic device may zoom out and display information on a contents region. Herein, the electronic device may zoom out and display information according to a zoom-out magnification determined based on a touch movement distance and a distance of touch points. According to another example, the electronic device may display scroll information about display information displayed on a contents region.

Figure 3B:
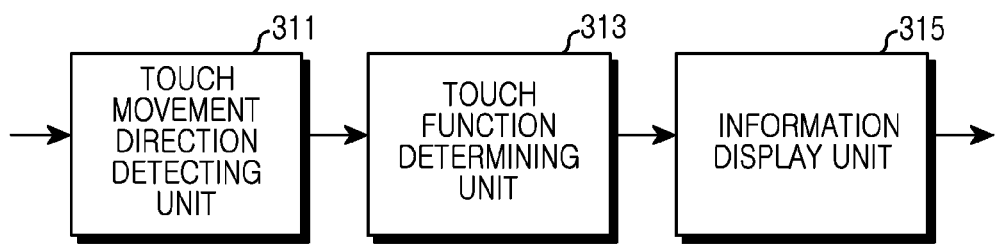
FIG. 3B is a block diagram illustrating a configuration of an electronic device for providing a zoom function based on a directivity of a touch movement according to one embodiment of the present disclosure.

FIG. 3B is a block diagram illustrating a configuration of an electronic device for providing a zoom function based on a directivity of a touch movement according to an embodiment of the present disclosure.

Referring FIG. 3B, the electronic device may include a touch movement direction detecting unit 311, a touch function determining unit 313, and an information display unit 315.

When a touch movement is detected, the touch movement direction detecting unit 311 verifies a touch movement direction. For example, the touch movement direction detecting unit 311 may determine a change angle α according to a touch movement based on a horizontal line 511 which passes through a first touch point 501 as shown in FIG. 5B. According to another example, the touch movement direction detecting unit 311 may determine a change angle α according to a touch movement based on a horizontal line 711 which passes through a touch movement direction change direction 703 shown in FIG. 7B. According to yet another example, the touch movement direction detecting unit 311 sets two reference segments 923 and 925 which are orthogonal to a first segment 921 for connecting touch points 901 and 911 with touch points 903 and 913 shown in FIG. 9 and pass through the touch points 901 and 911, respectively. Thereafter, the touch movement direction detecting unit 311 may determine change angles α (931) and β (933) according to touch movements based on two reference segments 923 and 925. If touch movements for three or more touch points are detected, the touch movement direction detecting unit 311 may select two of the touch points as reference touch points based on the center of gravity by the touch points. Herein, each of the horizontal lines 511 and 711 may include a line which is horizontal with a display unit.

The touch function determining unit 313 determines a touch function according to the touch movement direction. In one example, when the change angle α according to the touch movement is beyond a scroll threshold range, the touch function determining unit 313 may determine that a zoom function for display information is provided. Herein, the touch function determining unit 313 may determine a zoom-in/out for display information according to a touch movement direction. On the other hand, when the change angle α according to the touch movement is within the scroll threshold range, the touch function determining unit 313 may determine that a scroll function for display information is provided. In another example, the touch function determining unit 313 may compare the sum of change angles according to touch movements with a scroll threshold angle and determine whether a zoom function is provided. In more detail, when the sum of the change angles according to the touch movements is greater than a first scroll threshold angle, the touch function determining unit 313 may determine that display information is zoomed in. When the sum of the change angles according to the touch movements is less than a second scroll threshold angle, the touch function determining unit 313 may determine that display information is zoomed out. When the sum of the change angles according to the touch movements is less than or equal to the first scroll threshold angle and is greater than or equal to the second scroll threshold angle, the touch function determining unit 313 may determine that a scroll function for display information is provided.

The display information display unit 315 displays information on a contents region according to the touch function according to the touch movement direction. In one example, the display information display unit 315 may zoom in and display information on a contents region. Herein, the display information display unit 315 may zoom in and display information according to a zoom-in magnification determined based on a touch movement distance or a distance of touch points. In another example, the display information display unit 315 may zoom out and display information on a contents region. Herein, the display information display unit 315 may zoom out and display information according to a zoom-out magnification determined based on a touch movement distance and a distance of touch points. In another example, the display information display unit 315 may display scroll information about display information displayed on a contents region.

Figure 4:
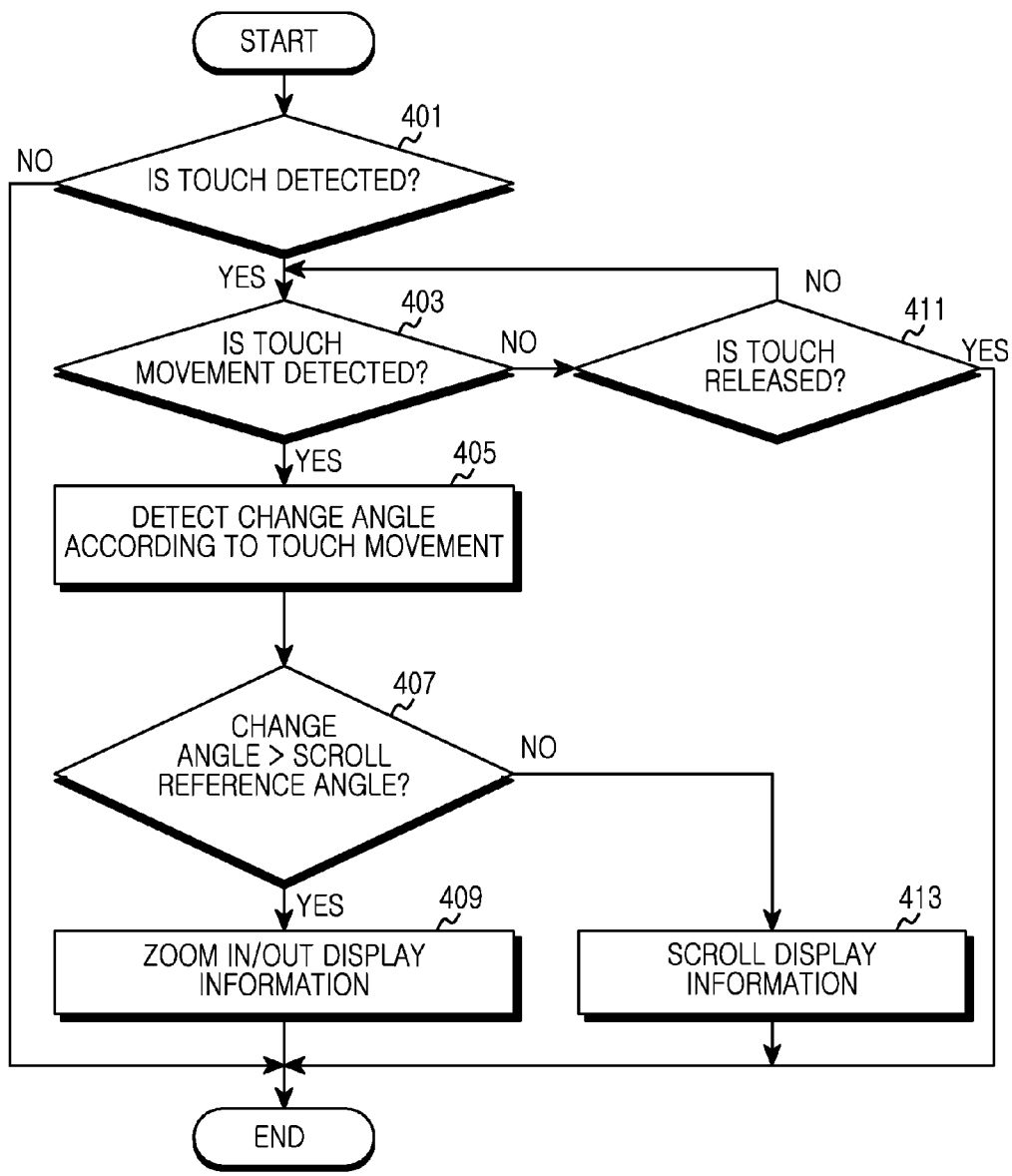
FIG. 4 is a flowchart illustrating a process of providing a zoom function based on touch information in an electronic device according to an embodiment of the present disclosure.

FIG. 4 is a flowchart illustrating a process of providing a zoom function based on touch information in an electronic device according to an embodiment of the present disclosure.

Referring FIG. 4, the electronic device verifies whether a touch is detected in operation 401. For example, as shown in FIG. 5A, the electronic device verifies whether a first touch is detected.

Thereafter, the electronic device proceeds to operation 403 and verifies whether a touch movement is detected. For example, the electronic device verifies a touch movement from a first touch point 501 shown in FIG. 5A is detected.

When the touch movement is not detected, the electronic device proceeds to operation 411 and verifies whether the touch is released.

When the touch is released, the electronic device may end the algorithm of FIG. 4.

On the other hand, when the touch is not released, the electronic device proceeds to operation 403 and verifies whether a touch movement is detected.

On the other hand, when the touch movement is detected in operation 403, the electronic device proceeds to operation 405 and verifies a change angle according to the touch movement. For example, as shown in FIG. 5A, when a touch movement (from a first touch point 501 to a second touch point 503) is detected, the electronic device may determine a change angle α according to a touch movement based on a horizontal line 511 which passes through a first touch point 501 shown in FIGS. 5B to 5D. Herein, the horizontal line 511 may include a line which is horizontal with a display unit.

Thereafter, the electronic device proceeds to operation 407 and verifies whether the change angle according to the touch movement is beyond a scroll reference range.

When the change angle according to the touch movement is beyond the scroll reference range, the electronic device may proceed to operation 409 and provide a zoom function for display information. For example, as shown in FIG. 5B, when a change angle α (523) according to a touch movement is beyond a scroll threshold range 521 in an upper direction, the electronic device may zoom in and display information. Herein, the electronic device may zoom in display information according to a zoom-in magnification according to a touch movement distance. In another example, as shown in FIG. 5C, when a change angle α (525) according to a touch movement is beyond the scroll threshold range 521 in a lower direction, the electronic device may zoom out and display information. Herein, the electronic device may zoom out display information according to a zoom-out magnification according to a touch movement distance.

On the other hand, when the change angle according to the touch movement is included in the scroll reference range in operation 407, the electronic device may proceeds to operation 413 and scroll display information according to a touch movement. For example, as shown in FIG. 5D, when a change angle α 527 according to a touch movement is within the scroll threshold range 521, the electronic device may display scroll information about display information.

Figure 6:
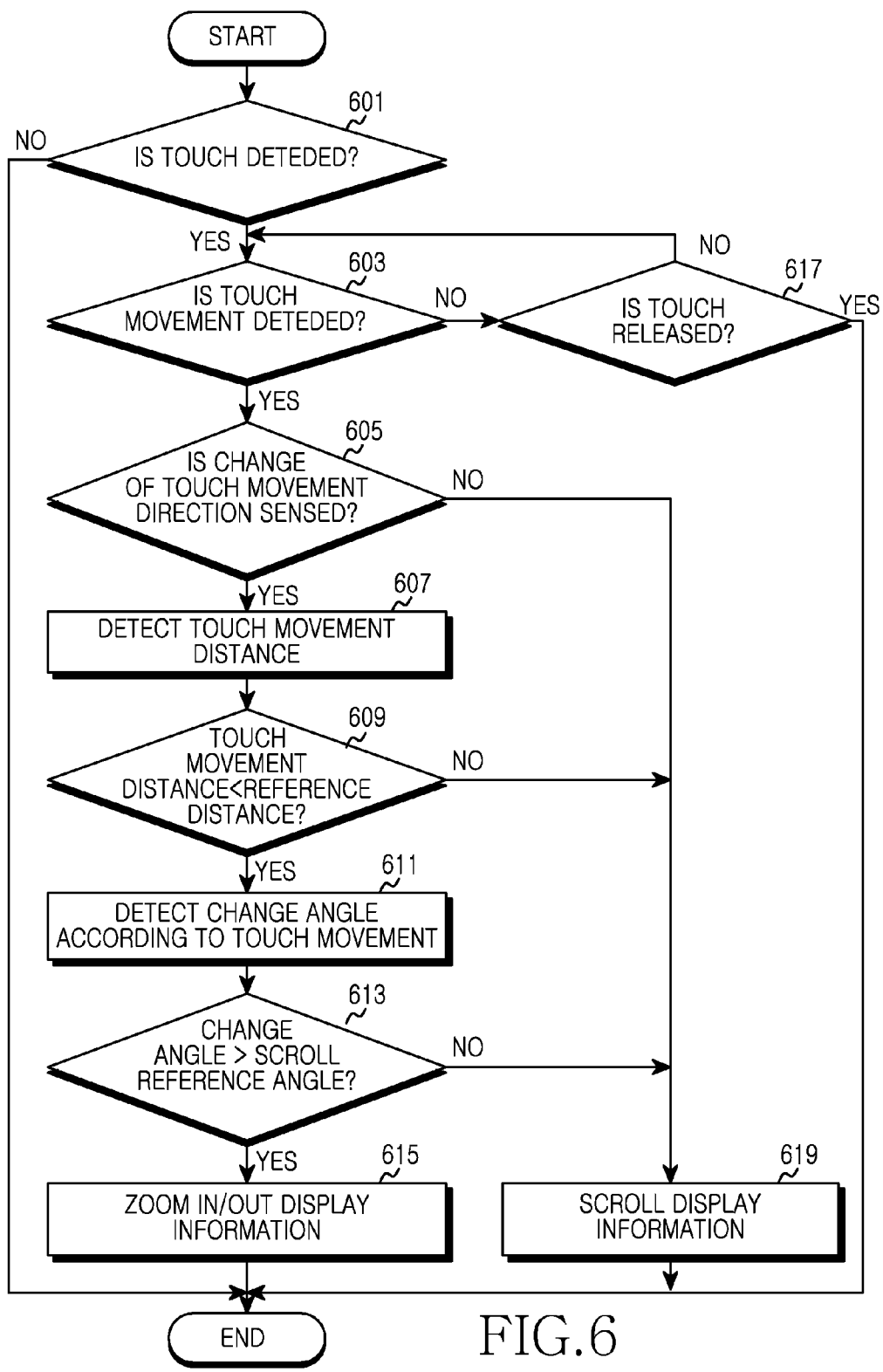
FIG. 6 is a flowchart illustrating a process of providing a zoom function based on touch information in an electronic device according to another embodiment of the present disclosure.

FIG. 6 is a flowchart illustrating a process of providing a zoom function based on touch information in an electronic device according to another embodiment of the present disclosure.

Referring to FIG. 6, the electronic device verifies whether a touch is detected in operation 601. For example, as shown in FIG. 7A, the electronic device verifies whether a first touch is detected.

Thereafter, the electronic device proceeds to operation 603 and verifies whether a touch movement is detected. For example, the electronic device verifies that a touch movement is detected from a first touch point 701 shown in FIG. 7A.

When the touch movement is not detected, the electronic device proceeds to operation 617 and verifies whether the touch is released.

When the touch is released, the electronic device may end the algorithm of FIG. 6.

On the other hand, when the touch is not released, the electronic device proceeds to operation 603 and verifies whether a touch movement is detected.

When the touch movement is detected in operation 603, the electronic device proceeds to operation 605 and verifies whether a touch movement direction is changed.

When the touch movement direction is not changed, the electronic device may proceed to operation 619 and scroll display information according to a touch movement.

On the other hand, when the change of the touch movement direction is detected in operation 605, the electronic device recognizes that a zoom function providing event is generated. Accordingly, the electronic device proceeds to operation 607 and verifies a distance to a touch movement direction change point. For example, when a movement direction for the first touch point 701 shown in FIG. 7A is changed in a touch movement direction change point 703, the electronic device verifies touch movement distances λ (723, 727, 731) from the first touch point 701 to the touch movement direction change point 703.

Thereafter, the electronic device proceeds to operation 609 and verifies whether the distance to the touch movement direction change point is less than a reference distance.

When the distance to the touch movement direction change point is greater than or equal to the reference distance, the electronic device may proceed to operation 619 and scroll display information according to a touch movement.

On the other hand, when the distance to the touch movement direction change point is less than the reference distance, the electronic device proceeds to operation 611 and verifies a change angle according to the touch movement. For example, the electronic device may determine a change angle α according to the touch movement based on a horizontal line 711 which passes through the touch movement direction change point 703 shown in FIGS. 7B to 7D. Herein, the horizontal line 711 may include a line which is horizontal with a display unit.

Thereafter, the electronic device proceeds to operation 613 and verifies whether the change angle according to the touch movement is beyond a scroll reference range.

When the change angle according to the touch movement is beyond the scroll reference range, the electronic device may proceed to operation 615 and provide a zoom function for display information. In one example, as shown in FIG. 7B, when a change angle α (729) according to a touch movement is beyond a scroll threshold range 721 in an upper direction, the electronic device may zoom in and display information. Herein, the electronic device may zoom in display information according to a zoom-in magnification according to a touch movement distance. In another example, as shown in FIG. 7C, when the change angle α (729) according to the touch movement is beyond the scroll threshold range 521 in a lower direction, the electronic device may zoom out and display information. Herein, the electronic device may zoom out display information according to a zoom-out magnification according to a touch movement distance.

On the other hand, when the change angle according to the touch movement is within the scroll reference range in operation 613, the electronic device may proceeds to operation 619 and scroll display information according to a touch movement. For example, as shown in FIG. 7D, when a change angle α 733 according to a touch movement is included in the scroll threshold range 721, the electronic device may display scroll information about display information.

As described above, the electronic device determines a zoom-in/out magnification based on the touch movement distance. For example, the electronic device may determine a zoom-in/out magnification in proportion to a touch movement distance using Equation 1 shown below.

$$\left(\frac{1}{x}\right) \times b \qquad \text{Equation 1}$$

Herein, b represents a touch movement distance, and x represents a reference variable for determining a zoom magnification.

As described above, providing the zoom function according to the touch movement direction, the electronic device may adjust a zoom in/out speed according the change of the touch movement direction for the zoom function. Also, the electronic device may zoom in/out only a partial interval in a contents region.

Figure 8:
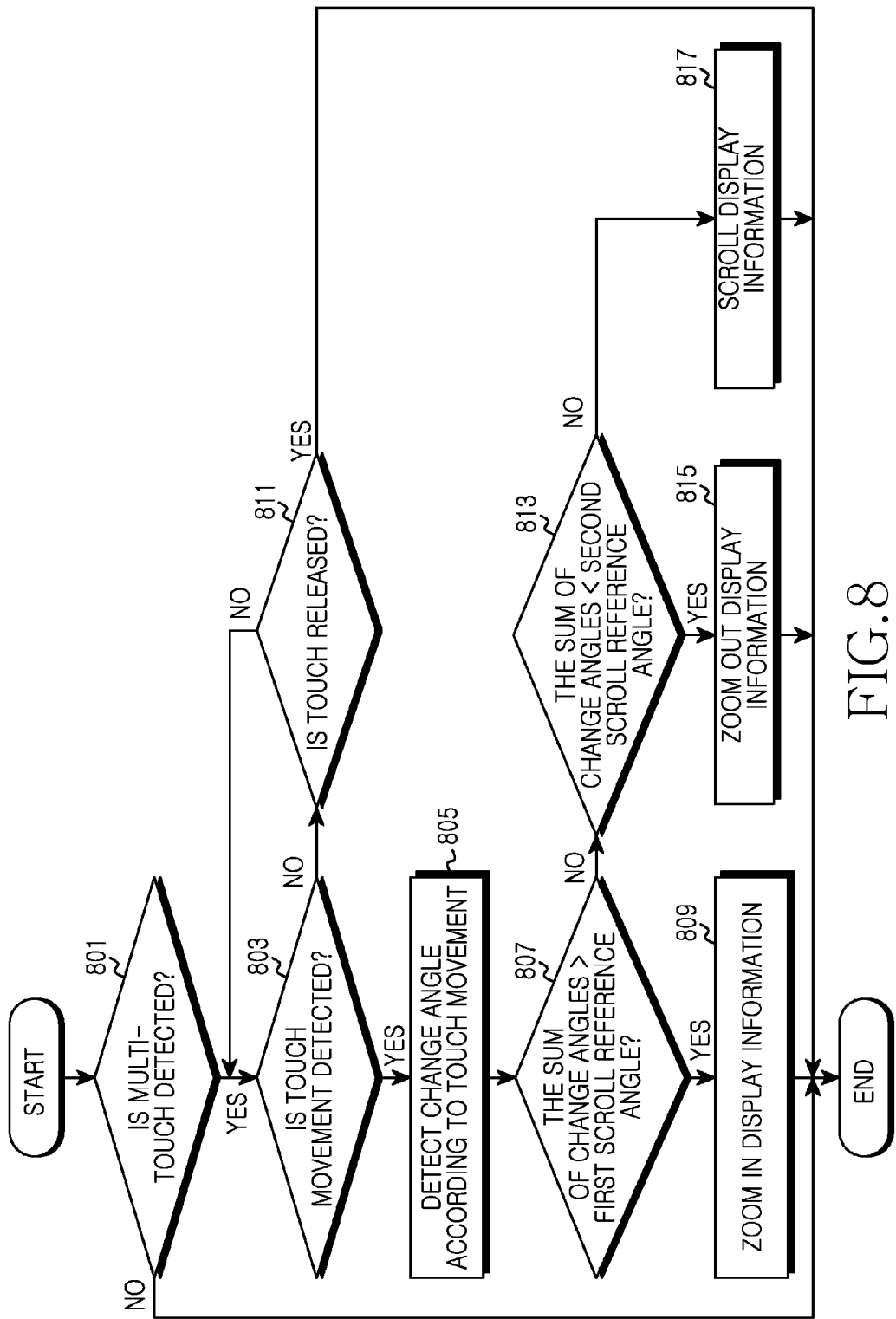
FIG. 8 is a flowchart illustrating a process of providing a zoom function based on multi-touch information in an electronic device according to another embodiment of the present disclosure.

FIG. 8 is a flowchart illustrating a process of providing a zoom function based on multi-touch information in an electronic device according to an embodiment of the present disclosure.

Referring FIG. 8, the electronic device verifies whether a multi-touch is detected in operation 801. For example, as shown in FIG. 9, the electronic device verifies whether a first touch and a second touch are detected.

Thereafter, the electronic device proceeds to operation 803 and verifies whether a touch movement is detected. For example, the electronic device verifies whether a touch movement is detected from at least one of a first touch point 901 and a second touch point 911 which are shown in FIG. 9.

When the touch movement is not detected, the electronic device proceeds to operation 811 and verifies whether a touch is released.

When the touch is released, the electronic device may end the algorithm of FIG. 8.

On the other hand, when the touch is not released, the electronic device proceeds to operation 803 and verifies whether a touch movement is detected.

When the touch movement is detected in operation 803, the electronic device proceeds to operation 805 and verifies a change angle according to the touch movement. For example, the electronic device sets two reference segments 923 and 925 which are orthogonal to a first segment 921 for connecting the touch points 901 and 911 with touch points 903 and 913 shown in FIG. 9 and pass through the touch points 901 and 911, respectively. Thereafter, the electronic device may determine change angles α (931) and β (933) according to touch movements based on the reference segments 923 and 925.

Thereafter, the electronic device proceeds to operation 807 and verifies whether the sum of the change angles according to the touch movements is greater than a first scroll reference angle by comparing the sum of the change angles according to the touch movements with the first scroll reference angle.

When the sum of the change angles according to the touch movements is greater than the first scroll reference angle, the electronic device may proceed to operation 809 and zoom in display information. For example, as shown in FIGS. 10A to 10C, when the sum (α+β) of change angles according to touch movements is greater than the first scroll threshold angle, the electronic device may zoom in and display information. Herein, the electronic device may zoom in display information according to a zoom-in magnification determined based on a distance of the touch points.

When the sum of the change angles according to the touch movements is less than or equal to the first scroll reference angle in operation 807, the electronic device proceeds to operation 813 and verifies whether the sum of the change angles according to the touch movements is less than a second scroll reference angle by comparing the sum of the change angles according to the touch movements with the second scroll reference angle.

When the sum of the change angles according to the touch movements is less than the second scroll reference angle, the electronic device may proceed to operation 815 and zoom out display information. For example, as shown in FIGS. 10D and 10E, when the sum (α+β) of the change angles according to the touch movements is less than the second scroll threshold angle, the electronic device may zoom out and display information. Herein, the electronic device may zoom out display information according to a zoom-out magnification determined based on a distance of the touch points.

When the sum of change angles according to touch movements is less than or equal to the first scroll threshold angle and is greater than or equal to the second scroll reference angle, the electronic device may proceed to operation 817 and scroll display information according to a touch movement. For example, as shown in FIG. 10F, when the sum of change angles according to touch movements is less than or equal to the first scroll threshold angle and is greater than or equal to the second scroll reference angle, the electronic device may display scroll information about display information.

In the above-described embodiment of the present disclosure, the electronic device may compare the sum of the change angles according to the touch movements with the scroll reference angles and provide the zoom function.

In another embodiment of the present disclosure, the electronic device may differently apply a zoom function determination condition according to touch movement directions of touch points. For example, when touch movement directions of touch points are identical to each other, the electronic device may provide a zoom function by comparing the sum of change angles of touch movements of the touch points with scroll reference angles. On the other hand, when the touch movement directions of the touch points differ from each other, the electronic device may provide a zoom function based on a distance of the center of gravity by the touch points and the touch points. As shown in FIG. 10A, when a touch movement direction of a first touch point 1001 and a touch movement direction of a second touch point 1011 differ from each other, the electronic device may provide a zoom function based on distances between each of touch points 1001, 1003, 1011, and 1013 and the center 1021 of gravity. In more detail, when the sum of a distance between the first touch point 1001 and the center 1021 of gravity and a distance between the second touch point 1011 and the center 1021 of gravity is greater than the sum of a distance between the third touch point 1003 and the center 1021 of gravity and a distance between the fourth touch point 1013 and the center 1021 of gravity, the electronic device may determine that display information is zoomed out. When the sum of the distance between the first touch point 1001 and the center 1021 of gravity and the distance between the second touch point 1011 and the center 1021 of gravity is less than the sum of the distance between the third touch point 1003 and the center 1021 of gravity and the distance between the fourth touch point 1013 and the center 1021 of gravity, the electronic device may determine that display information is zoomed in. When the sum of the distance between the first touch point 1001 and the center 1021 of gravity and the distance between the second touch point 1011 and the center 1021 of gravity is equal to the sum of the distance between the third touch point 1003 and the center 1021 of gravity and the distance between the fourth touch point 1013 and the center 1021 of gravity, the electronic device may determine that display information is scrolled. Herein, the center 1021 of gravity indicates the center of gravity by the first touch point 1001 and the second touch point 1011.

Figure 11B:
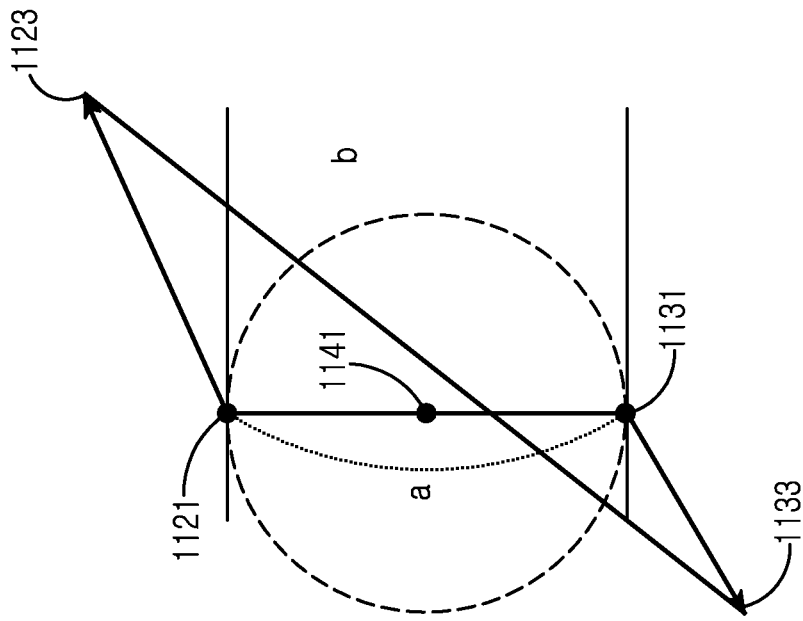
FIGS. 11A and 11B illustrate a process of determining a zoom-in/out ratio in an electronic device according to an embodiment of the present disclosure.
Figure 11A:
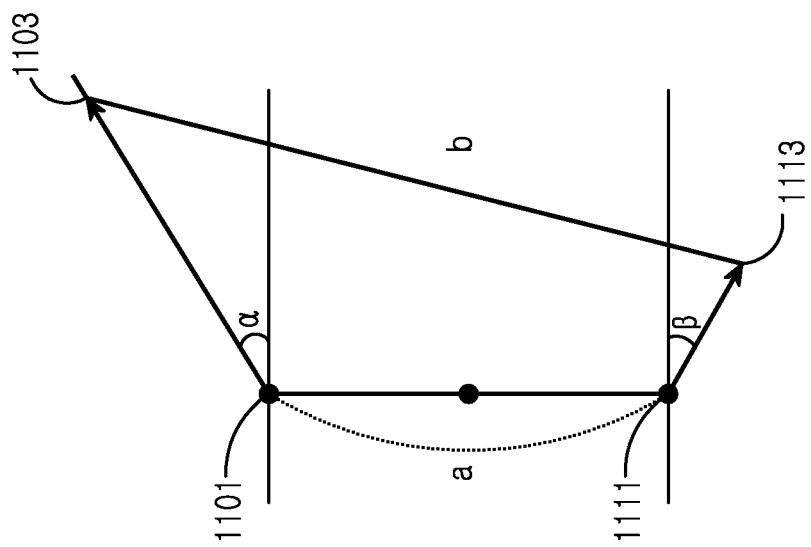

As described above, the electronic device determines a zoom-in/out magnification for the display information based on the distance between the touch points. That is, the electronic device may determine a zoom-in/out magnification according to a ratio between a distance of touch points before a touch is moved and a distance of touch points after the touch is moved. For example, as shown in FIG. 11A, a touch movement direction of a first touch point 1101 and a touch movement direction of a second touch point 1111 are identical to each other, the electronic device may determine a zoom-in/out magnification for display information according to a ratio between "a" distance a between the first and second touch points 1101 and 1111 and a distance "b" between the third and fourth touch points 1103 and 1113. For example, as shown in FIG. 11B, a touch movement direction of a first touch point 1121 and a touch movement direction of a second touch point 1131 differ from each other, the electronic device may determine a zoom-in/out magnification for display information according to a ratio between a distance "a" between the first and second touch points 1121 and 1131 and a distance "b" between third and fourth touch points 1123 and 1133. In another example, as shown in FIG. 11B, when the touch movement direction of the first touch point 1121 and the touch movement direction of the second touch point 1131 differ from each other, the electronic device may determine a zoom-in/out magnification for display information according to a ratio between a distance between the first touch point 1121 and the center 1141 of gravity and a distance between the second touch point 1131 and the center 1141 of gravity. Herein, the center 1141 of gravity indicates the center of gravity by the first touch point 1121 and the second touch point 1131.

As described above, when the multi-touch is detected, the electronic device may determine the reference segments according to the touch points and determine the change angles according to the touch movements based on the reference segments. If three or more touches are detected, the electronic device may select two reference touch points for determining a reference segment based on the center of gravity by the touch points. As shown in FIG. 12A, when three touches are detected, the electronic device may determine a first center 1207 of gravity of a first triangle defined by three touch points 1201, 1203, and 1205. As shown in FIG. 12B, when movements for three touches are detected, the electronic device may determine the second center 1217 of gravity of a second triangle defined by three touch points 1211, 1213, and 1215 according to the touch movements. As shown in FIG. 12C, the electronic device verifies acute angles 1223 and 1225 of a portion where a first segment 1221 for connecting the first center 1207 of gravity with the second center 1217 of gravity and sides of the second triangle are overlapped. Herein, as shown in FIG. 12D, the electronic device may select two touch points 1231 and 1233 of a side which crosses the first segment 1221 at the angle 1223 as reference touch points between the angles 1223 and 1225 of the portion where the first segment 1221 and the sides of the second triangle are overlapped.

Figure 13B:
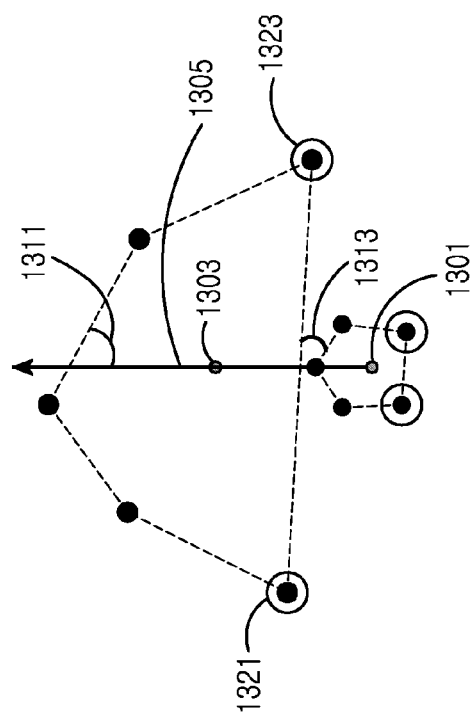
FIGS. 13A and 13B are screens illustrating a process of providing a zoom function based on multi-touch information in an electronic device according to an embodiment of the present disclosure.
Figure 13A:
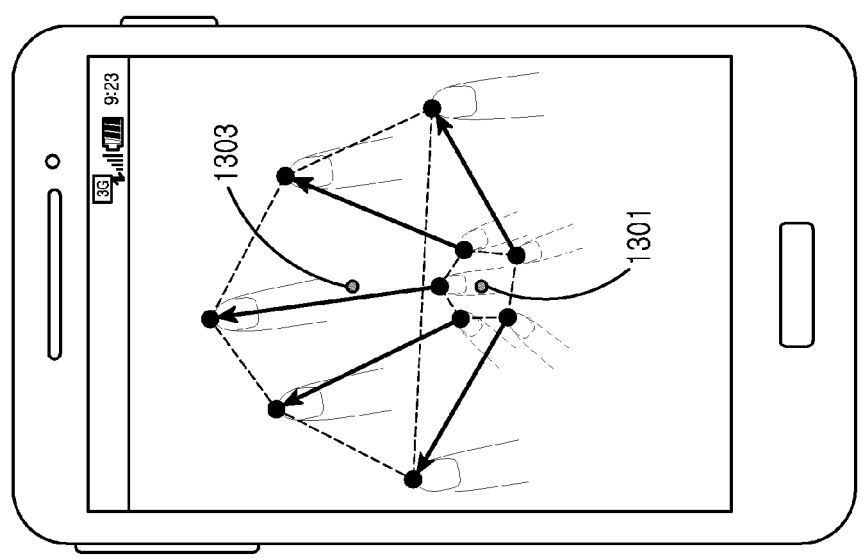

In another example, as shown in FIG. 13A, if five touches are detected, the electronic device may determine the first center 1301 of gravity of a first pentagon defined by five touch points. When movements for the five touches are detected, the electronic device may determine the second center 1303 of gravity of a second pentagon defined by the five touch points according to the touch movements. As shown in FIG. 13B, the electronic device verifies acute angles 1311 and 1313 of a portion where a first segment 1305 for connecting the first center 1301 of gravity with the second center 1303 of gravity and sides of the second pentagon are overlapped. Herein, as shown in FIG. 13B, the electronic device may select two touch points 1321 and 1323 of a side which crosses the first segment 1305 at the angle 1313 as reference touch points between the angles 1311 and 1313 of the portion where the first segment 1305 and the sides of the second pentagon are overlapped.

Figure 14B:
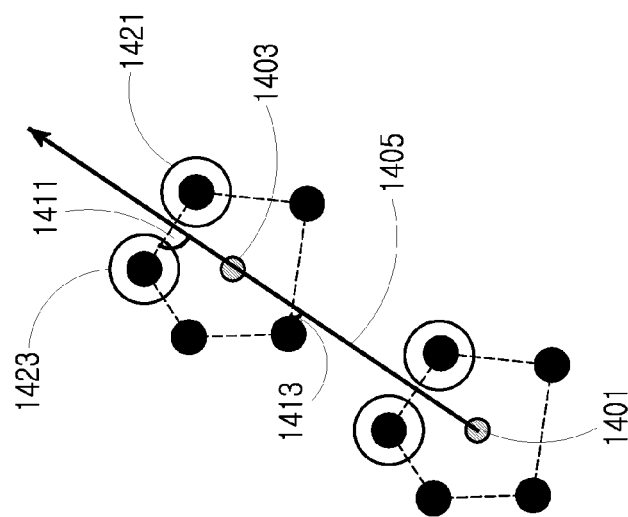
FIGS. 14A and 14B are screens illustrating a process of providing a zoom function based on multi-touch information in an electronic device according to another embodiment of the present disclosure.
Figure 14A:
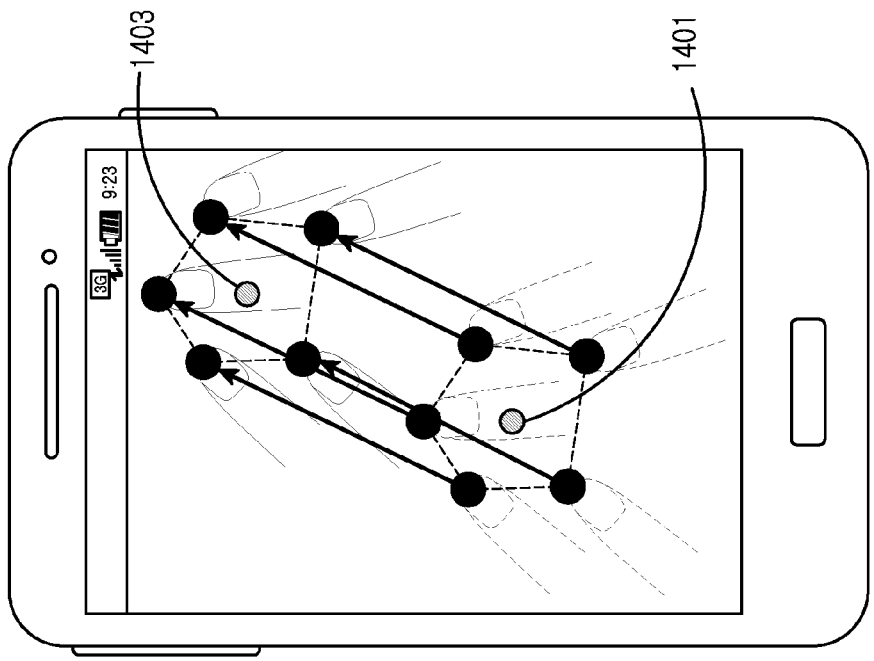

In another example, as shown in FIG. 14A, if five touches are detected, the electronic device may determine the first center 1401 of gravity of a first pentagon defined by five touch points. When movements for the five touches are detected, the electronic device may determine the second center 1403 of gravity of a second pentagon defined by the five touch points according to the touch movements. As shown in FIG. 14B, the electronic device verifies acute angles 1411 and 1413 of a portion where a first segment 1405 for connecting the first center 1401 of gravity with the second center 1403 of gravity and sides of the second pentagon are overlapped. Herein, as shown in FIG. 14B, the electronic device may select two touch points 1421 and 1423 of a side which crosses the first segment 1405 at the angle 1413 as reference touch points between the angles 1411 and 1413 of the portion where the first segment 1405 and the sides of the second pentagon are overlapped.

Figure 15B:
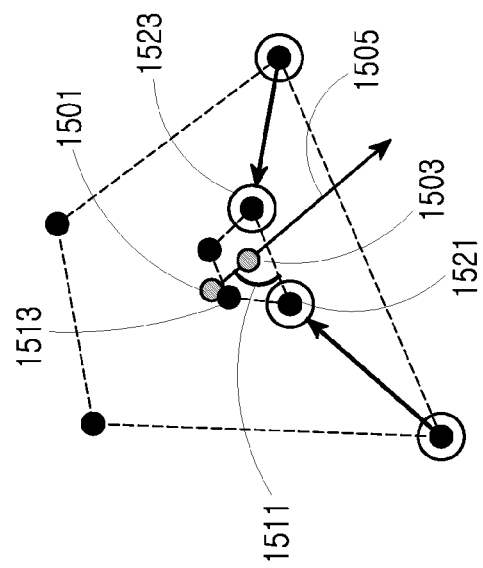
FIGS. 15A and 15B are screens illustrating a process of providing a zoom function based on multi-touch information in an electronic device according to another embodiment of the present disclosure.
Figure 15A:
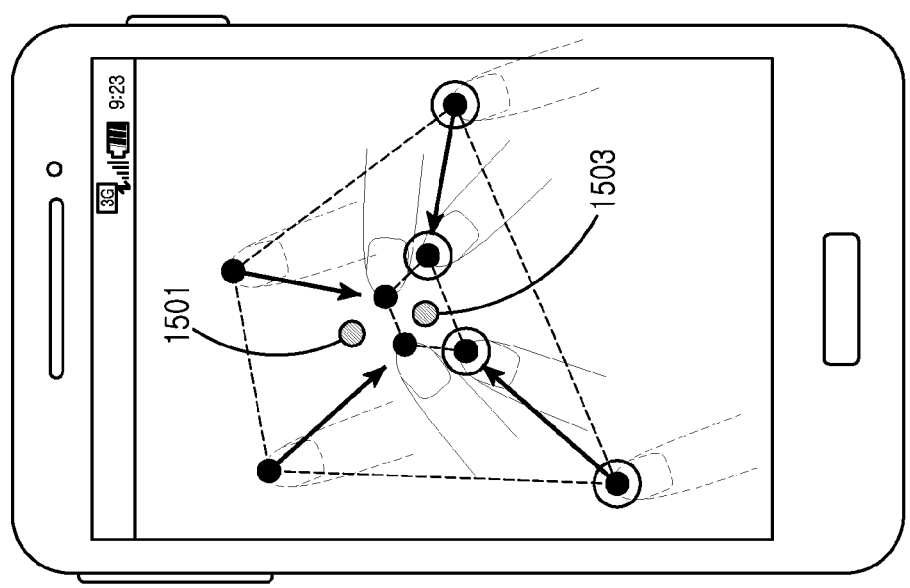

In another example, as shown in FIG. 15A, if four touches are detected, the electronic device may determine the first center 1501 of gravity of a first tetragon defined by four touch points. When movements for the four touches are detected, the electronic device may determine the second center 1503 of gravity of a second tetragon defined by the four touch points according to the touch movements. As shown in FIG. 15B, the electronic device verifies acute angles 1511 and 1513 of a portion where a first segment 1505 for connecting the first center 1501 of gravity with the second center 1503 of gravity and sides of the second tetragon are overlapped. Herein, as shown in FIG. 15B, the electronic device may select two touch points 1521 and 1523 of a side which crosses the first segment 1505 at the angle 1513 as reference touch points between the angles 1511 and 1513 of the portion where the first segment 1505 and the sides of the second tetragon are overlapped.

In the above-described embodiment of the present disclosure, the electronic device may provide a zoom function based on a touch movement direction for at least one touch point among the touch points detected through the multi-touch.

Figure 16C:
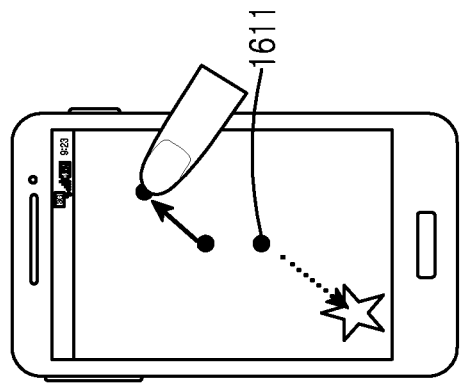
FIGS. 16A, 16B, and 16C are screens illustrating a process of providing a zoom function based on multi-touch information in an electronic device according to another embodiment of the present disclosure.
Figure 16B:
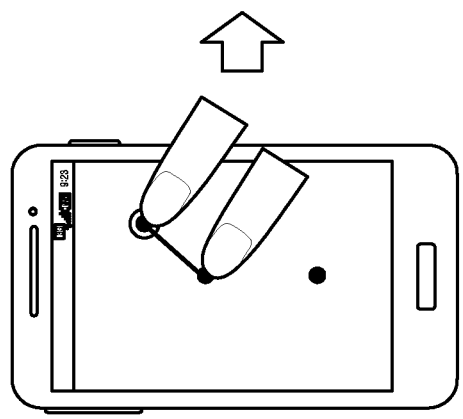
Figure 16A:
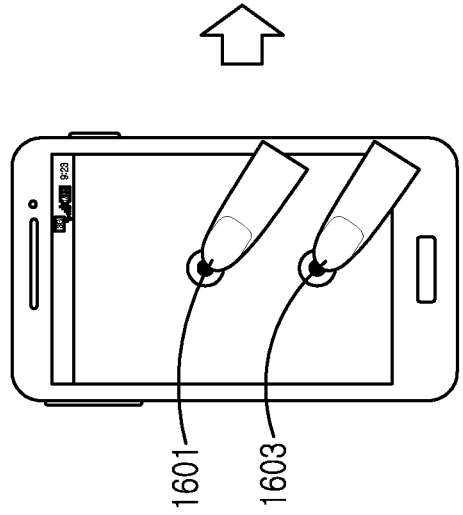

In another embodiment of the present disclosure, the electronic device may provide a zoom function based on a touch movement direction although a touch for at least one touch point is released among touch points detected through a multi-touch. For example, as shown in FIG. 16A, after a multi-touch is detected, when a second touch shown in FIG. 16B is released, as shown in FIG. 16C, the electronic device recognizes that a movement of the second touch is generated to be symmetric with a movement of the first touch based on the center 1611 of gravity of first and second touch points 1601 and 1603 when the first touch is moved. Therefore, the electronic device may provide a zoom function based on touch movement directions of the first touch and the second touch.

As described above, the electronic device having the touch screen may allow the user to easily recognize a zoom-in/out method by zooming in/out and displaying the display information based on a directivity of the touch movement.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    detecting a touch;
    detecting whether a movement direction of the touch is changed when a movement of the touch is detected;
    determining a distance from a first point where the touch is detected to a second point where the movement direction is changed;

scrolling display information according to the movement of the touch when the distance is greater than or equal to a reference distance;

determining an angle according to the movement of the touch, when the distance is less than the reference distance; and zooming in/out display information based on the angle when the angle is greater than a reference angle range.

2. The method of claim 1, wherein the determining of the angle comprises:
determining the angle according to the movement of the touch based on a horizontal line which passes through the first point when the movement of the touch is detected.

3. The method of claim 1, wherein the determining of the angle comprises:
determining the angle according to the movement of the touch based on a horizontal line which passes through the second point where the movement direction of the touch is changed when the movement direction of the touch is changed.

4. The method of claim 1, the determining of the angle comprises:
determining the angle according to the movement of the touch based on a horizontal line which passes through the second point where the movement direction of the touch is changed when the distance is less than the reference distance.

5. The method of claim 1, wherein the zooming-in/out of the display information comprises:
determining a zoom function of the display information based on the movement direction of the touch when the angle according to the movement of the touch is greater than the reference angle range; and zooming in/out the display information according to the zoom function of the display information.

6. The method of claim 5, further comprising scrolling the display information according to the movement of the touch when the angle according to the movement of the touch is included in the reference angle range.

7. The method of claim 5, wherein the zooming-in/out of the display information comprises:
determining a zooming-in/out magnification of the display information based on a movement distance of the touch when the zoom function of the display information is determined; and zooming in/out the display information according to the zooming-in/out magnification.

8. The method of claim 1, wherein the determining of the angle comprises:
detecting a first touch and a second touch;
generating reference lines corresponding to the first touch and the second touch when a movement of at least one of the first touch and the second touch is detected; and
determining angles according to the movement of the touch based on the reference lines,
wherein the reference lines are orthogonal to a first segment for connecting the first touch with the second touch and include straight lines which include the first touch and the second touch, respectively.

9. The method of claim 8, wherein the zooming-in/out of the display information comprises:
zooming in the display information when a sum of the angles according to the movement of the touch is greater than a first reference angle range; and zooming out the display information when a sum of the angles according to the movement of the touch is less than a second reference angle range.

10. The method of claim 9, further comprising scrolling the display information based on the movement of the touch when the sum of the angles according to the movement of the touch is less than or equal to the first reference angle range and is greater than or equal to the second reference angle range.

11. The method of claim 8, wherein the zooming-in/out of the display information comprises:
determining a zooming in/out magnification of the display information based on a ratio between a distance between the first touch and the second touch and a distance between a moved first touch and a moved second touch; and zooming in/out the display information according to the zooming-in/out magnification.

12. The method of claim 1, wherein the determining of the angle comprises:
detecting a plurality of touches;
determining a first reference point and a second reference point among the plurality of touches when a movement of at least one of the plurality of touches is detected;
generating reference lines of the first reference point and the second reference point; and
determining angles according to movements of the touches of the first reference point and the second reference point based on the reference lines,
wherein the reference lines are orthogonal to a first segment for connecting the first reference point with the second reference point and include straight lines which include the first reference point and the second reference point, respectively.

13. The method of claim 12, wherein the determination of the first reference point and the second reference point comprises:
determining a first center of gravity of a first figure defined by a plurality of points;
determining a second center of gravity of a second figure defined by moved points; and
determining the first reference point and the second reference point among the points based on a segment which forms the greatest angle among acute angles generated when a first segment for connecting the first center of gravity with the second center of gravity and sides of the second figure are overlapped.

14. An electronic device comprising:
a touch screen; and
at least one processor,
wherein the at least one processor is configured to:
detect a touch,
detect whether a movement direction of the touch is changed when a movement of the touch is detected,
determine a distance from a first point where the touch is detected to a second point where the movement direction of the touch is changed,
scroll display information displayed on the touch screen according to the movement of the touch when the distance is greater than or equal to a reference distance,
determine an angle according to the movement of the touch when the distance is less than the reference distance, and
zoom in/out display information displayed on the touch screen based on the angle when the angle is greater than a reference angle range.

15. The electronic device of claim 14, wherein the at least one processor determines the angle according to the movement of the touch based on a horizontal line which passes through the first point when a movement of the touch detected on the touch screen is detected.

16. The electronic device of claim 14, wherein the at least one processor is further configured to determine the angle according to the movement of the touch based on a horizontal line which passes through the second point where the movement direction of the touch is changed when the movement direction of the touch is changed.

17. The electronic device of claim 14, wherein the at least one processor is further configured to determine the angle according to the movement of the touch based on a horizontal line which passes through the second point where the movement direction of the touch is changed when the distance is less than the reference distance.

18. The electronic device of claim 14, wherein the at least one processor is further configured to determine a zoom function of the display information based on the movement direction of the touch when the angle according to the movement of the touch is greater than the reference angle range and zooms in/out the display information according to the zoom function of the display information.

19. The electronic device of claim 18, wherein the at least one processor is further configured to scroll the display information according to the movement of the touch when the angle according to the movement of the touch is included in the reference angle range.

20. The electronic device of claim 17, wherein the at least one processor is further configured to determine a zooming-in/out magnification for the display information based on a movement distance of the touch when a zoom function for the display information is determined and zooms in/out the display information according to the zooming-in/out magnification.

21. The electronic device of claim 14,
wherein the at least one processor is further configured to:
during the detecting of the touch, detect a first touch and a second touch,
generate reference lines corresponding to the first touch and the second touch when a movement for at least one of the first touch and the second touch is detected, and
determine angles according to the movement of the touch based on the reference lines, and
wherein the reference lines are orthogonal to a first segment for connecting the first touch with the second touch and include straight lines which include the first touch and the second touch, respectively.

22. The electronic device of claim 21, wherein the at least one processor is further configured to zoom in the display information when a sum of the angles according to the movement of the touch is greater than a first reference angle range and zooms out the display information when a sum of the angles according to the movement of the touch is less than a second reference angle range.

23. The electronic device of claim 22, wherein the at least one processor is further configured to scroll the display information based on the movement of the touch when the sum of the angles according to the movement of the touch is less than or equal to the first reference angle range and is greater than or equal to the second reference angle range.

24. The electronic device of claim 21, wherein the at least one processor is further configured to determine a zooming in/out magnification of the display information based on a ratio between a distance between the first touch and the second touch and a distance between a moved first touch and a moved second touch and zooms in/out the display information according to the zooming-in/out magnification.

25. The electronic device of claim 14,
wherein the at least one processor is further configured to:
determine a first reference point and a second reference point among a plurality of touches when a movement of at least one of the plurality of touches is detected,
generate reference lines of the first reference point and the second reference point, and
determine angles according to movements of the touches of the first reference point and the second reference point based on the reference lines, and
wherein the reference lines are orthogonal to a first segment for connecting the first reference point with the second reference point and include straight lines which include the first reference point and the second reference point, respectively.

26. The electronic device of claim 25, wherein the at least one processor is further configured to:
determine the first center of gravity of a first figure defined by a plurality of points,
determine the second center of gravity of a second figure defined by moved points, and
determine the first reference point and the second reference point among the points based on a segment which forms the greatest angle among acute angles generated when a first segment for connecting the first center of gravity with the second center of gravity and sides of the second figure are overlapped.

27. A non-transitory computer readable medium for storing a computer program of instructions configured to be readable by at least one processor for instructing the at least one processor to execute a computer process for performing the method of claim 1.

28. The method of claim 1, further comprising:
detecting a multi-touch including a first touch and a second touch;
detecting whether the second touch is released;
determining a movement direction of the first touch according to a movement of the first touch when the movement of the first touch is detected; and
performing a zooming function for display information corresponding to the movement-direction of the first touch.

29. The method of claim 28, further comprising:
recognizing a movement of the second touch that is generated to be symmetric with the movement of the first touch based on a center of gravity between the first touch and the second touch, when the first touch is moved; and
performing the zoom function based on movement directions of the first touch and the second touch.

30. The electronic device of claim 14, wherein the at least one processor is further configured to:
detect a multi-touch including a first touch and a second touch;
detect whether the second touch is released;
determine a movement direction of the first touch according to a movement of the first touch when the movement of the first touch is detected; and
perform a zooming function for display information corresponding to the movement-direction of the first touch.

31. The electronic device of claim 30, wherein the at least one processor is further configured to:

recognize a movement of the second touch that is generated to be symmetric with the movement of the first touch based on a center of gravity between the first touch and the second touch, when the first touch is moved; and perform the zoom function based on movement directions of the first touch and the second touch.

\* \* \* \* \*